US006782369B1

United States Patent
Carrott (12) United States Patent
(10) Patent No.: US 6,782,369 B1
(45) Date of Patent: Aug. 24, 2004

(54) METHOD FOR ALLOCATING COMMISSIONS OVER THE INTERNET USING DEFINED EXCLUSIVE SALES AREAS

(75) Inventor: Richard F. Carrott, Moorpark, CA (US)

(73) Assignee: Careau & Co., Moorpark, CA (US)

(*) Notice: Subject to any disclaimer, the term of this patent is extended or adjusted under 35 U.S.C. 154(b) by 432 days.

(21) Appl. No.: 09/475,126

(22) Filed: Dec. 30, 1999

(51) Int. Cl.[7] .............................................. G06F 17/60
(52) U.S. Cl. ................................ 705/1; 705/26; 705/8
(58) Field of Search .............................. 705/10, 14, 26, 705/27, 37, 40, 30, 59, 39

(56) References Cited

U.S. PATENT DOCUMENTS

| | | | |
|---|---|---|---|
| 4,750,119 A | | 6/1988 | Cohen et al. |
| 5,202,826 A | | 4/1993 | McCarthy |
| 5,287,268 A | | 2/1994 | McCarthy |
| 5,297,026 A | | 3/1994 | Hoffman |
| 5,359,508 A | | 10/1994 | Rossides |
| 5,537,314 A | * | 7/1996 | Kanter ........................ 705/14 |
| 5,729,693 A | | 3/1998 | Holda-Fleck |
| 5,787,404 A | | 7/1998 | Fernandez-Holmann |
| 5,812,980 A | * | 9/1998 | Asai .............................. 705/1 |
| 5,923,016 A | | 7/1999 | Fredregill et al. |
| 5,924,078 A | | 7/1999 | Naftzger |
| 5,946,662 A | * | 8/1999 | Ettl et al. ....................... 705/8 |
| 5,974,395 A | * | 10/1999 | Bellini et al. .................. 705/9 |
| 6,029,141 A | * | 2/2000 | Bezos et al. .................. 705/27 |
| 6,085,170 A | * | 7/2000 | Tsukuda ....................... 705/26 |
| 6,091,835 A | * | 7/2000 | Smithies et al. ............ 382/115 |

FOREIGN PATENT DOCUMENTS

JP 11098136 * 4/1999 .......... G06F/13/00

OTHER PUBLICATIONS

Travelsavers, www.travelsavers.com, 1999–2000, pp. 1–5.*
SanFilipo, Michelle, Travelsavers'Rescue Plan, Jul. 12, 1999, Travel Agent, pp. 1 and 2.*
Rice, Kate, Consumer Web Site Breaks New Ground, Jun. 7, 1999, Leisure Travel News, p. 1.*

* cited by examiner

Primary Examiner—James P. Trammell
(74) Attorney, Agent, or Firm—McGinn & Gibb, PLLC (57) ABSTRACT

A computer system and method of allocating commissions for sales made over the Internet and for dividing an otherwise indivisible Internet into defined geographic areas includes processes for: defining exclusive geographic distribution/representation areas with respect to the World Wide Web, the Internet, and e-commerce; selling exclusive geographic distribution/representation areas; recording sales of goods delivered to the exclusive geographic distribution/representation areas placed through an Internet web site; determining a value of the goods delivered to each of the geographic distribution/representation areas, and allocating the commissions based solely on the value of the goods delivered to each of the geographic distribution/representation areas.

42 Claims, 4 Drawing Sheets

METHOD FOR ALLOCATING COMMISSIONS OVER THE INTERNET USING DEFINED EXCLUSIVE SALES AREAS

BACKGROUND OF THE INVENTION

1. Field of the Invention

The present invention generally relates to e-commerce and more particularly to a novel system and process for allocating commissions, based upon an equally novel system and process of establishing a network of local distributors to promote sales of services and merchandise over the Internet (or any other electronic, broad based audio-visual communication medium).

2. Description of the Related Art

Commerce on the Internet (e-commerce) and traditional product-to-market programs (including the brick-and-mortar sectors and the various forms of the conventional direct marketing sector—e.g., direct mail, party hosting, telemarketing, and multi-level marketing) are increasingly viewed as competitive modes of bringing product to the consumer. While each system has its advantages, they represent alternative distribution channels, but e-commerce is still in its infancy.

The present invention solves a problem that begins with what makes the Internet so attractive—the potential of cheap, instant customer access. The tradeoff for this is the loss of local contact, based on the infinite nature of the World Wide Web—a virtual market place with no geography.

The basic problem is how to divide an otherwise indivisible Internet into defined geographic areas for such useful purposes as maintaining customer contact, promoting product sales, and paying commissions. The invention opens a pathway for Web-based businesses to maintain personal contact with their customers and facilitate other useful purposes.

Conventional retail outlets, referred to as "brick-and-mortar" stores function through real estate, location, and staff to get the consumer through the door in order to "make the sale." This adds an expensive layer to marketing. The same is true for other brick-and-mortar sectors, including the service sector and the business-to-business sector.

The promise of a good e-commerce Web site is to instantly reach a larger customer base than any known business method without the brick-and-mortar expenses. Any person with a computer and access to the Internet can reach around the world, making the Internet both a threat and an attraction to any multi-market brick-and-mortar operator. Stated simply, disk space is cheaper than real estate.

Another major problem the invention solves relates to market area. A retail store, an office or a warehouse is established to service a given (i.e., limited) geographical area. The concept of market area, sales area, or service area is not new; however, the geographical service area for e-commerce is worldwide, thus the term World Wide Web. By design, the World Wide Web is without beginning or end; it is a universal market that, by design, cannot be divided into geographical parts. This has created problems with such things as restricting gambling or sales of controlled products.

Over the centuries, commerce has evolved from caravans and ships traveling to remote areas and selling their goods at makeshift bazaars to today's central distribution systems—brick-and-mortar structures. Where the local demographics support the expense, the "local merchant" has become a Wal-Mart, the "local grocer" has become a Kroger store, and the "local hardware" has become a Home Depot. In other words, the economies of scale have become available only to areas where the expense can be justified. The Internet and the invention help to solve this dilemma.

In its simplest form, e-commerce allows a consumer to push a button and buy direct. In theory, the economies of scale and overhead savings are passed to the customer. Location and geography are not part of the equation. Access to the Internet and the ability to deliver what is ordered are the only requirements. The only sacrifices are personal contact and a local presence. These are not minor issues, but they are problems addressed by the invention.

The idea of going direct to the market is not a new concept. Direct marketing, such as infomercials, multi-level marketing (including telemarketing), and the Fuller Brush Salesman (now, the Avon Lady or the Amway distributor), has existed for years. Their methods do not readily translate to the Internet.

The conflict over how to embrace both the current distribution system (in whatever form is used) and the new system presents a conundrum. Attempted solutions, such as access portals and links, tend to complicate and compound the differences.

Manufacturers want to sell where the customer is; however, the Internet means the customer is everywhere—and the supplier can be anywhere. The result is that the concepts of market and of competition are being re-defined. It (the Internet) is a place of business without borders that defies the conventions of marketing methods that have evolved from personal contact.

Massive advertising budgets geared to name recognition are an answer, but some current studies suggest that less than 1.5% of the visitors to a site buy something. This creates a cost-per-visitor problem solved by the invention.

Amazon.com represents to have the largest retail customer base on the Internet, but it has yet to post a profit. This illustrates the fact that shepherding customers to a Web site, within the economies of e-commerce's promise, is the key to the Internet's future.

The problem of how to get customers to e-commerce sites is balanced by the opposing problem of how to get customers through the door (i.e., away from the Internet). The three examples below, suggest the inability of the current systems to deal with both the opportunities and risks of e-commerce.

The first example is a brick-and-mortar retailer. Faced with the threat imposed by e-commerce, one national hardware chain apparently determined that keeping product off the Internet would keep customers from buying there. The hardware chain sent letters to all of its suppliers informing them that the store might be hesitant to do business with suppliers that become competitors by selling to the same customers over the Internet. This type of reaction imposes a choice of alternative markets to manufacturers and suppliers, combined with the threat of losing a major avenue to market.

A second example is direct marketing. Again, faced with the growth of the Internet's potential, one company that supports the "party" distribution system chose to add a clause to its contracts with distributors and independent sales representatives prohibiting them from offering product over the Internet.

The problem is that this form of direct marketing relies on saturating an area with an independent sales force—a concept of friend selling friend. Going to the Internet threatens those independent sellers and their market, which translates into losing sales people. As an answer to this problem, one company is attempting to keep everyone off the Internet and stay with the old ways.

A third example of the inherent conflicts of systems is the attempt to blend the two worlds. For the brick-and-mortar retailer, the example of this resolution is what has become known as click-and-mortar. A retailer uses one system to create the image for the other. The problem is that the Internet prices need to be the same as the in-store prices or customers feel cheated.

For the direct marketer, an example has been to offer special pages for sales people to offer their customers. Here the customer enters the company's site through a privatized page and the sales person is credited with any sales. Some of the problems of such a system are tracking the sales and getting people to enter through a special page rather than the company's main page.

One need only consider the typical program for introducing a new product to understand the full difference in marketing systems. A test market is generally established before products are considered for general release. The known demographics of that test market are essential to the results. It is impossible to partition the Internet for a market study. The market is the world and the test group can only be limited to those who log-on.

The invention, described below, overcomes these complications with a hardware/software solution that controls record keeping to properly and reliably allocate sales commissions. It does this without depending upon complex customer originated sales information and without detracting from the established brick-and-mortar local sales structure. More to the point, it creates a system for effectively defining market areas over the otherwise market without boundaries, regions, or territories—the Internet.

SUMMARY OF THE INVENTION

The present invention solves the problem of how to divide an otherwise indivisible Internet into defined geographic areas for useful purposes such as promoting product sales and paying commissions. The invention comprises a computer system and method of allocating commissions for sales made over the Internet and includes processes for: defining exclusive geographic distribution/representation areas with respect to the World Wide Web, the Internet, and e-commerce; selling exclusive geographic distribution/ representation areas; recording sales of goods delivered to the exclusive geographic distribution/representation areas placed through an Internet web site; determining a value of the goods delivered to each of the geographic distribution/ representation areas, and allocating the commissions based solely on the value of the goods delivered to each of the geographic distribution/representation areas.

The exclusive geographic distribution/representation areas are sold for one of a plurality of Web partner programs. Many separate Web partner programs may exist in each of the geographic distribution/representation areas. Each of the Web partner programs is associated with a distinct product line and only one entity can own a particular Web partner distribution right within a given exclusive geographic sales area. These exclusive geographic distribution/representation areas are referred to as defined, exclusive areas (DEAs).

The present invention maintains records of the sales for the plurality of Web partner programs through a single centralized system. The invention uses the funds generated by the selling to operate the Web partner programs. In addition, the invention verifies a sale through digital recording of an oral agreement.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS

In less than a decade the Internet has grown from a few million dollars to about $100 billion, and it is projected to reach the $1 trillion threshold within five years. This growth and combination of communication and instant consumer contact has no rival in history. However, e-commerce can never replace personal contact sales; at best it represents competition for a market share. The problem addressed by the invention, discussed in detail below, is how to effectively localize this novel market, bringing the consumer into direct contact with its potential.

An important feature of the invention is a computerized system that processes data regarding sales commissions, based exclusively upon distribution areas, regardless of originating salesperson or sale location. More specifically, referring now to FIG. 1, a first embodiment of the invention is illustrated in flowchart form. The invention first defines exclusive geographic sales areas 10. For example, in the United States the geographic sales areas could be drawn along state boundaries, city/town boundaries, county boundaries, zip codes, area codes, etc. In one embodiment, individuals purchase the exclusive sales areas for a fee. Such individuals are referred to herein as "distributors".

Figure 1:
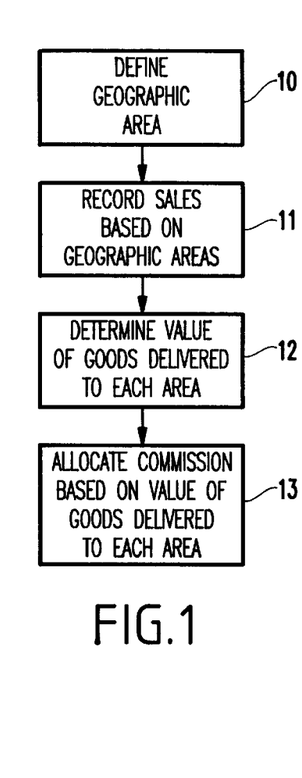
FIG. 1 is a schematic architectural flow diagram of one embodiment of the invention.

The invention then records delivery of goods or services to the exclusive geographic distribution/representation areas placed through an Internet Web site 11. Next, as shown in item 12, the invention determines the value of goods delivered to each of the geographic distribution/representation areas and, as shown in item 13 allocates commissions based on the value of goods delivered to each of the geographic distribution/representation areas.

Therefore, while sales of similar goods made may be occurring through other, related distribution channels (brick and mortar stores, direct sale marketing, etc.) the invention only tracks sales made through a specific Internet web site, rendering the invention compatible with existing methods.

The invention can be used in conjunction with the conventional sales distribution systems discussed above, without competing with such conventional sales distribution systems. For example, a hardware store could use the invention to market a line of goods (e.g., tools) that it sells through its physical stores. The hardware store would be expanding from brick-and-mortar to click-and-mortar. For a fraction of its overhead cost, it could expand its presence and market, expanding to new areas through the inventive distribution system supported by its brick-and-mortar operations.

On the other hand, a manufacturer, such as the tool supplier itself could establish a program for sales of its products only through areas outside the market area of its major brick-and-mortar customers, using the invention to become what is referred to herein as a "Web partner." In this embodiment of the invention, the Web partner could choose to resolve potential conflicts with it brick-and-mortar customers by crediting them a share of incidental sales made in their market areas toward future purchases. Alternatively, the Web partner could assign specified market areas to its brick-and-mortar customers.

Without pre-existing conflicts, the operator, or potential operator, of an e-commerce site can become Web partner without restriction as to where the exclusive areas can be established. In this unrestricted embodiment of the invention, the motivation is to shepherd as many customers to the particular site as possible and sell as much product as possible.

The inventive method is especially useful with orders placed over an Internet web site (where orders can be placed from any location). Basing the commission upon the dollar value of items delivered to a specific geographic area eliminates the necessity of tracking the source of the sale. Therefore, the inventive method motivates individual distributors to generate sales that will be delivered within their geographic region.

Three important elements of the invention are discussed below. A first important element is the defined, exclusive area (DEA) distribution system. The DEA distribution system is new and useful to e-commerce (i.e., the Internet). This form of distribution system is used to shepherd customers to the Web site rather than distribute product to the customer. It is a method of solving one of the largest problems facing this new avenue of e-commerce by reversing the very concept and definition of distribution. The method is better referred to as a "reverse distribution system," bringing market to product rather than product to market.

A second important element is the sale of the DEA. The invention includes a cryptographically assisted module for selling the DEA, discussed in detail below.

A third important element is the payment of commissions. As discussed above, the purpose of the DEA is a reverse-distribution system designed to bring the customer to the product source rather than the product to the customer. The fact that the commission is paid based on the product delivery would be a double-reversal but for the fact that it is based on the location of the delivery completion of sale.

The current measure of Web success, termed traffic, hits, or visitors to a site, is promoted by such Internet innovations as search engines, banners, links, and "spamming." As an alternative, to these forms of promotion and to the more traditional, more expensive forms such as print, radio, and television, the invention promotes the success of a Web site through a vast network of local distributors working directly with the site in exclusive market areas. In other words, in contrast to current methods, the motivation for the distributor, through the invention, is the volume of goods and services delivered to their exclusive geographic area not the number of "hits" a Web site receives. This means customers, not visitors are directed to the Web site.

The invention promotes the identification, contracting and monitoring of distributors in upwards of 20,000 unique and exclusive zones (using, for example, the United States Post Office zip code geographic division system). The area identifiers ("DEAs" or "DEA tags") for each of these geographic zones is established and maintained through a central server system. The defined exclusive areas can be marketed using any number of well-known techniques, such as multi-level marketing, Web site based sales, telemarketing, etc. In one embodiment, the telemarketing sales force receives a commission incentive for each completed sale of a distributorship, subject to an audio recording or acknowledgment of sale (e.g., the cryptographically assisted module discussed below). The records of each sale must be verified and maintained for challenge from regulators and from all parties related to the sales.

Additionally, the distribution areas for each Web partner (e.g., product manufacturer) are program-exclusive. This means one DEA distributor system for each Web partner, or e-commerce site. In any given defined area, there may be several distributors, but only one can represent a specific Web partner's product or service. The central server system maintains a separate DEA tag, when issued, for each product line in each defined area.

As used herein the term "Web partner program" refers to the defined exclusive area for one Web partner's product or service. Each Web partner program can be based upon a manufacturer's or operator's entire line of products and/or services or a limited number of such products and/or services. Therefore, different manufacturers will have different Web partner programs. The invention identifies DEAs that have been purchased by distributors and records all program-specific deliveries to that DEA based on the unique DEA tags.

While the central corporation controls the sale of the DEAs, it does not control the distributors. The result is that there can be different Web partners selling similar products and services. The invention deals with the form and means of the commission based delivery and distribution systems, not the concepts of sales and competition. These are merely adjuncts to the invention and results of its practical applications. However, the form of sale relies on a category of product or services provided agreement with the Web partner, under which the Web partner accepts representation by any distributor not competing in the specific categories listed. The practical effect of this agreement is to resolve any potential conflicts.

Each DEA sold to distributors is for one Web partner program, although a distributor may clearly purchase multiple DEA's for different Web partner programs within a single geographic area. This allows many different products from several Web partner programs to be sold in each area through various distributor representatives. Thus, each distributor has an exclusive right with respect to a specific Web partner program within the given geographic area.

The invention maintains an accurate accounting of products delivered (as well as the sales dollars and Web programs involved) to each defined area over any specific period. The DEA distributors have the same incentive as the Web partner and the central corporation for requiring these controls, as they receive performance over-rides on area deliveries.

The inventive system monitors and records the financial information flow and makes all calculations necessary to maintain a Web partner's financial information. This module of the invention is termed "Web partner's financial services configuration". The Web partner financial services configuration allows the central corporation to pool the staff functions and maintenance of several partners, or "spokes," into a single portfolio, or "Hub," allowing for consolidation of, inter alia, the costs of administering operations combined with the tax advantages of a Web partnership. In particular, this system provides means for staffing at a higher level than available to most new companies.

One result of this Hub structure is to allow the measurement of successful DEA distributor programs to be used, through Web partner specific chat rooms, to assist and develop new or under-performing distributors. The maintenance and supervision of a distributor "chat room" for each Web partner program is an additional feature of the invention. These are support areas for the distributors to share and learn effective ways of increasing sales in their area. Because the areas are exclusive there is no concern over sharing information with others, and incentives are offered for the best programs. The Hub element of the invention helps overcome what are often strong barriers preventing the sharing of successful sales tactics.

The invention additionally tracks all the relevant data, on a daily basis, for the sale of each Spoke's distributorships. Regulatory concerns alone, based on the history and reputation of the telemarketing industry, make this control and monitoring operation of the invention important. The newness of the Internet has led to widespread speculation as to the involvement of future regulation. The decrees of regulation could be devastating to new or unsophisticated operators.

One modification to the above-referenced "zip code" geographic area division occurs when one zip code has insufficient population to support a Web partner program. In such a situation, the invention can set a minimum population requirement. For example, one minimum population could be 20,000 individuals. However, the invention is not limited to this minimum population requirement. Instead, the minimum population requirement will be dependent upon the products manufactured by the Web partner, the demographics within the zip code in question and other similar constraints.

The invention produces a number of unexpected benefits, such as those discussed above with respect to the reverse marketing system. Further, the invention produces the unexpected benefit of preparing each Web partner for a potential initial public offering (IPO). The invention is useful not only for well-established publicly held manufacturers but is equally attractive to small start-up manufacturers because of the reduced overhead associated with Internet sales, as discussed above. Most small start-up companies have the goal of becoming larger corporations. In order to become a larger more successful corporation, the small start-up manufacturer will have to raise operating capital, which is often accomplished through an initial public offering (IPO). Whether or not an IPO is pursued, the qualification for an IPO represents a measurable standard of operations and controlled growth for the corporation to obtain other financing.

The invention helps prepare each Web partner for an IPO by providing a low overhead system of distribution and audited record keeping. Since each distributor performs marketing operations at no cost to the Web partner and because the Web partner avoids the traditional costs associated with a brick and mortar stores, the overhead for the Web partner is substantially reduced. Further, because the distributor fee, if any, is utilized to fund the Web partner program, the cost to the Web partner is even further reduced.

In one embodiment of the invention, however, a user of the invention may choose not to charge a distribution fee, setting other criteria for the DEA distributor, such as performance. Not withstanding this, the more expected approach is that the fee will be charged, and the unexpected benefits to a fee based DEA sale would be the deferment of expenses for the Web partner. These benefits are especially useful for small start-up companies that have limited capital resources.

In order to achieve such benefits, the invention controls and monitors all aspects of a multitude of Web partners. The competition for the development of an e-commerce site along these lines is traditionally debt or equity financing. The candidate company gets the money and some advice; then, it's on its own.

While the intent of the present invention is also to infuse needed money, the difference is that the money comes with a built in market and customer source. The result of this embodiment of the invention is that Web site plus money plus customer base creates a strong equation.

There are two common ways of rating and maintaining the value of an e-commerce business. One is the number of viewers that visit the sites, referred to as "hits." The other way is the valuation based upon sales and earnings. The invention relies on providing customers rather than hits, which represents a substantial benefit to the Web partner. As mentioned above, the distributor's motivation is delivered goods or services, which in turn requires that the effort be made within their DEA that will change potential customers (viewers) to buyers. Therefore, an important benefit produced by the invention is to bring the site together with the customer in a unique way, not by random searching, but for the explicit purpose of purchasing a specific product from a specific supplier as motivated by the actions of the distributor.

A result of one embodiment of the invention is, therefore, that the Web partner's site is taken from inception to possible IPO, not through a measure of "viewer hits per page," but by actual sales delivered and controlled by a program that integrates and regulates a grass-roots distributor network with a sophisticated computer-commerce environment.

This illustrates one of the differences between the invention and conventional systems e-commerce site development. These conventional systems might include investment bankers or business incubators. If an investment-banking firm identifies an Internet company as having potential or significant growth, the banker or its clients might make an investment, with an eye toward a public offering or merger as an exit strategy. An investment banker's role is to bring money into the program, make money, and exit; taking whatever steps are necessary to achieve these goals. In contrast, the present invention brings customers into the program. The money generated by the inventive system is actually an unexpected benefit of the effort expended to increase sales.

The invention can also be contrasted with business incubators that provide a full range of resources to infuse startup companies with the development strategies and financial support needed to rapidly introduce innovative products and services. The resources include office space and the accompanying network infrastructure, consulting and services relating to development and technology, graphic design, marketing, competitive research, and professional support, such as legal and accounting. This is a good concept for sharing resources and conventional equity investing for following a product from development to market. However, it is capital intensive and does not produce the potential e-commerce customer base available with the invention.

As provided, by allocating distributor commissions based on the location of product or service delivery, the present invention allows the World Wide Web to be segmented, a non-obvious treatment of this otherwise indivisible market place. While the concept of regional sales and commissions based upon regional performance are not new, they are inapplicable to a market place without geography. That is exactly what the Internet and e-commerce represent. By definition they are the embodiment of a continuous conversation, without geographical boundaries, that has been developed into, among other things, a vehicle for communicating worldwide commerce. A regional sales manager can be provided a commission based solely upon his "region" because his region has geography and can be defined. Such is not the case with the Internet.

While the business trappings of the Internet have been given traditional references, they are inapplicable. An example is that an e-commerce "store" is not a store; it is at best a virtual-store. Labels do not provide a proper element of reality. The present invention is able to provide a novel approach to this virtual world of commerce by reversing the definitions (e.g., reverse distribution system) and relying upon a system of allocating commissions not based upon sales but, rather, upon point of delivery. This is not mere semantics; it is the element of the invention from which the other elements flow and without which it would be impossible to apply defined areas to the Internet.

Indeed, all versions of the conventional programs mentioned above attempt to bring marketing and finance to e-commerce through conventional means. They rely on conventional approaches to market based upon geography and demographics, either of which applies to the Internet. In terms of finance, the traditional "exist" strategy approach has crowded the IPO market with promise instead of earnings. In turn, this exist strategy must make sense at the inception of the program. The present invention focuses on markets only in terms of where the customer exits product from the virtual world and leaves the IPO as a down stream choice (e.g., potential benefit of profitable customer sales).

Figure 2:
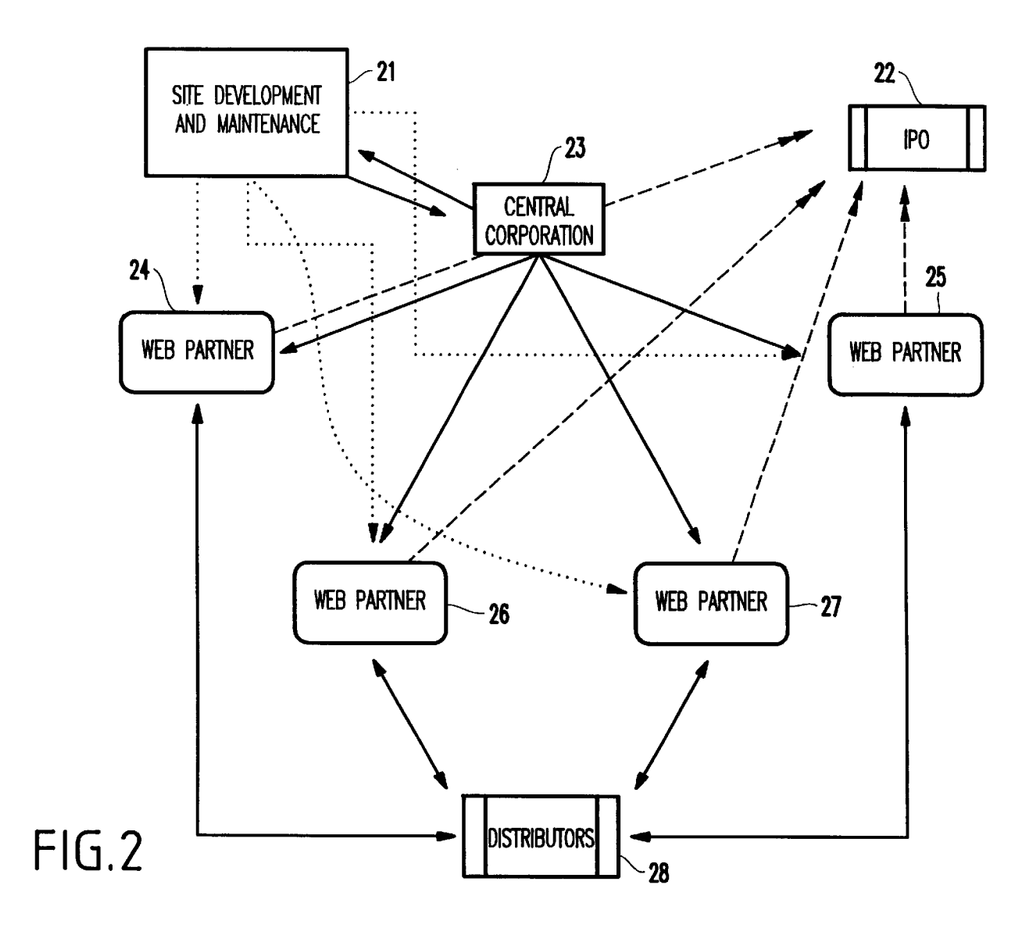
FIG. 2 is a schematic architectural diagram of one embodiment of the invention.

Referring now to FIG. 2, an architectural flow diagram "Web partner" chart is illustrated. The company which administers the inventive system, identified here and referred to above as the "central corporation" 23, has arranged Web partnerships with Web partners 24–27. The central corporation 23 is illustrated as a single item in FIG. 2; however, as would be known by one ordinarily skilled in the art given this disclosure, the central corporation could be a division, subsidiary, etc. of another corporation. As discussed above, the distributors 28 purchase DEA's relating to one or more of the Web partners 24–27. A site development and maintenance facility 21 maintains or improves the appearance of the Web site and acts as the host for the site. All of the Web partners involved in this process work toward one common goal of positioning each of the four Web partners for an IPO 22.

While the ultimate goal of developing each of the Web sites is to take the site through an IPO 22, the development process itself is also an important focus. FIG. 2 illustrates that other means of "selling" the product or service of the sites is available. For example, the central corporation 23 may contract with an external supplier to offer the services of one or more of the Web partners 24–27. This would not interfere with the distributor's rights or commission, because if product were delivered in the distributor's DEA, that distributor would receive his full commission.

Figure 3:
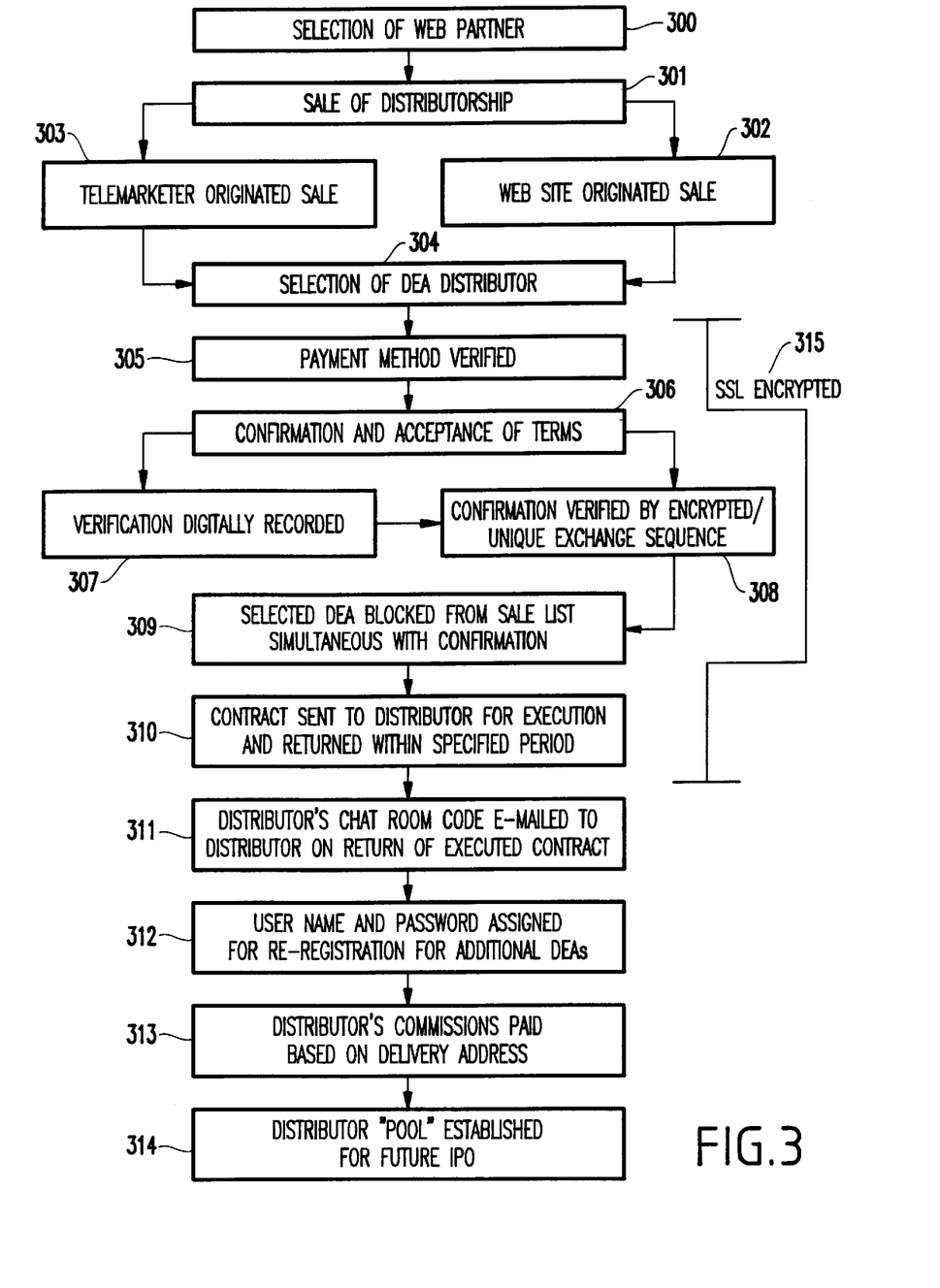
FIG. 3 is a schematic architectural flow diagram illustrating an embodiment of the invention.

FIG. 3 is a schematic architectural flow diagram illustrating the operation of the system shown in FIG. 2. The beginning of the inventive DEA distribution system is the selection of one or more Web partners 301. This can be a person or group with either a new idea for a Web site or an existing Web site.

As mentioned above, the inventive distribution system brings customers to a Web site (e.g., shepherds them to the site). This shepherding begins with the sale of the distributorship 301, referred to as the DEA. These sales could be made through both contract telemarketers 303 and directly over the Internet 302. The prospective distributor selects a DEA from a database list of available areas 304. A single database system could be utilized for the selection and sale process to minimize the risk of error and duplication of sale.

The next several processes (e.g., 305–310) are secure socket layer (SSL) encrypted 115. The SSL encryption process involves an assigned certificate from a "trusted" source, which is modified to the present invention's application.

After the appropriate DEA has been chosen, the secure payment method (e.g., credit card number, check, etc.) and other, necessary information is entered 305. This process not only verifies the person's ability to pay the distribution fee, but also helps establish the person's identity.

Next, the process for confirming and accepting the terms of agreement is initiated 306. The process involves exchange-keyed entries that are both specific and transactionally unique. The key-exchange is required at various points throughout the documentation. This exchange is supported by a transaction-generated encryption. The key-exchange is an element of the sale of the DEA but only for purposes of confirming the transaction.

Whether a telemarketer initiates the sale of the DEA or it is conducted directly over the Internet, the basic process is the same, with one exception. Because the telemarketer is paid a commission, or service fee, a digital recording 307 is made of the scripted acceptance of sale terms. This recording is added to a library file and is encoded to the specific transaction. A final encryption, acknowledged through a ciphered-confirmation exchange (tied to the personal information and credit card number) takes place 308.

Simultaneous to the conclusion of this step, the selected DEA is "blocked" from further sale and a written verification of the agreement is mailed to the distributor, for execution and return within a specific period 309.

Once the signed distributor agreement is returned 310, the distributor is e-mailed a chat room code 311. If the distributor elects to secure other DEA's, the code (user name and password) serves as a re-entry code (even for separate Web partner sites) and provides access to product discounts 312.

As mentioned above, the distributor's commission is based solely on the delivery address for the product or service 313. This is only possible because of the exclusivity element of the distribution areas. Therefore, with the invention there are no portals, no links, and no special requirements over who was responsible for the sale, the type or size of the sale, etc. Instead, the only requirement is a delivery address. Thus, with the invention, if a delivery is made within the DEA, the commission is paid. This not only encourages the distributors to shepherd customers to the Web partner's Web site, it also simplifies the process of auditing commissions paid or due. The final step of the process is that the distributor becomes part of a "distributor pool" for the anticipated IPO 314.

As mentioned above, the invention provides for the Web partner's success by bringing customers from the DEA. The distributor is allowed to share in the success of the program by, for example, participating in a pooled percentage of the Web partner's stock in the event of an IPO. Based on a measured result of the DEA's contribution to the Web partner's success the distributor could be entitled, subject to regulations and other conditions, to acquire the newly issued stock at the opening market price.

Figure 4:
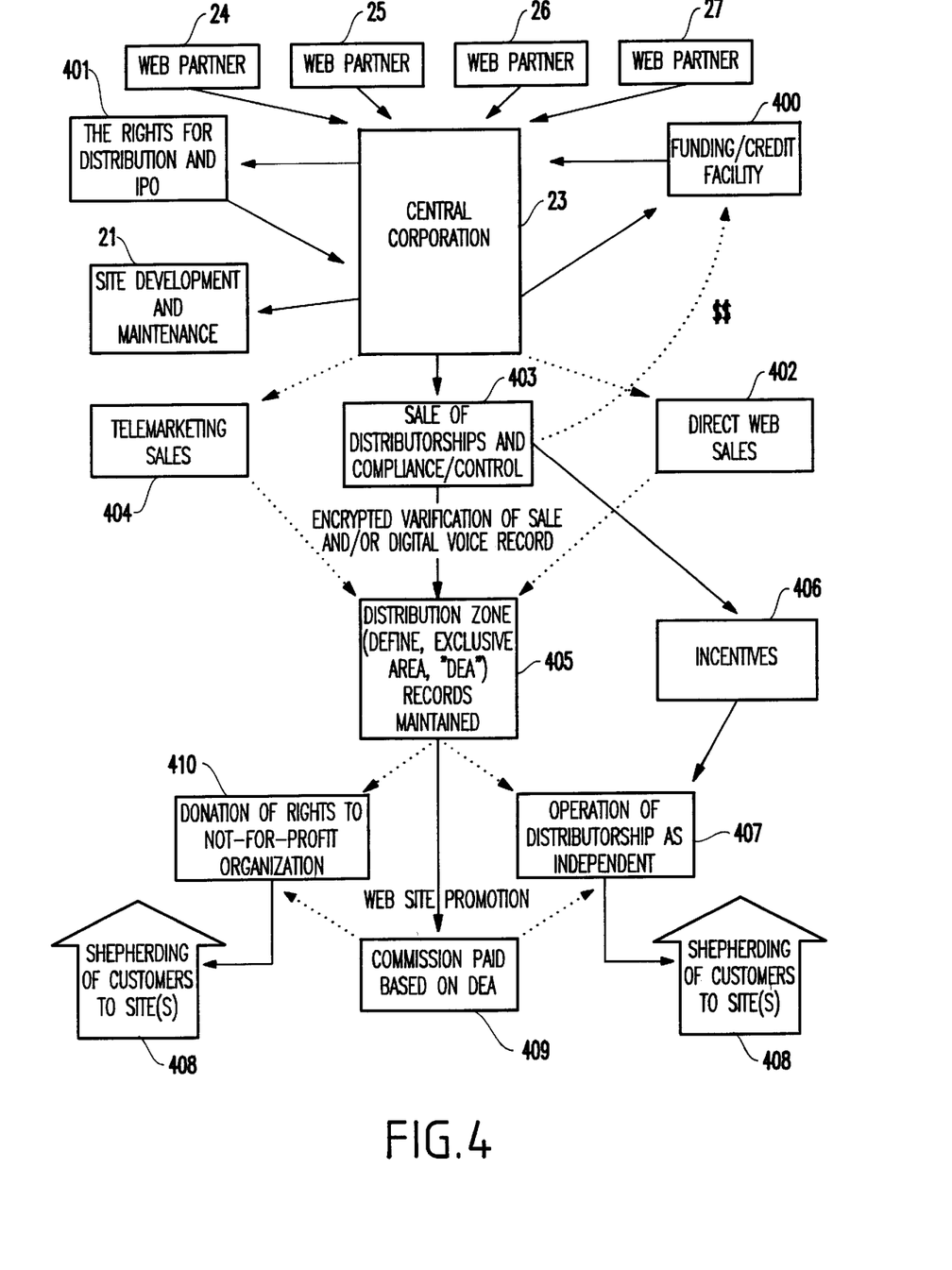
FIG. 4 is a schematic architectural diagram of one embodiment of the invention.

FIG. 4 is a schematic architectural diagram illustrating the relationship of various portions of the invention, as well as the transactional interplay achieved with the invention. At the center of all activity is the central corporation 23, which establishes the Web partners 24–27 and maintains the Web sites through the site development and maintenance function 21, as discussed above. The Web partner 24–27 operates the site; the central corporation 23 merely provides the tools (i.e., the system that generates the customers). Therefore, it is up to the Web partner to provide the product and competitive price, lack of either one of which can doom the site. The central corporation 23 controls the product distribution and maintains rights for the IPO in item 401. Each Web partner's site development is financed through the funding/credit facility 400, which, in turn is funded by the sale of the distributorships 403.

As discussed above, the invention controls and monitors the sale of the DEA's for every Web partner through a single database 403. This is true, whether the sales are done under telemarketing contract 404 or through direct sales on the Internet 402. The encryption and key-exchange process for confirming the sale and the acknowledgment of what is being secured by the sale follows the same secure procedure discussed above, no matter which sale method is chosen. The encrypted copy of the key-exchange (and in the case of the telemarketing sale, the digital recording) is libraried for legal, tax and IPO reasons 405. An incidental incentive (e.g., a travel voucher, free products, etc.) could be given to the distributors with the purchase of a DEA 406.

The independent distributor is then entitled to begin marketing the site's product and/or service 407. One embodiment of this marketing might involve a not-for-profit organization acting as a distributor. This could be the result of a charitable donation of the purchased rights or the actual purchase of the rights. The benefit might be to have a "membership body" acting in unison to promote the organizations interest as distributor. Variations on this embodiment may exist for tax and marketing purposes 410. As discussed above, the ultimate goal is the shepherding of customers to site(s) 408, which is the role of the DEA distributor. In item 409, the commissions for all products are based solely upon the value of products delivered within the DEA.

The measure of success in any program is being able to accomplish the ultimate goal. In this case, that goal is the repeated ability to achieve an IPO. Whether or not the IPO is pursued, the standards for achieving an IPO are the measurement of the process. The ability to repeat this process is defined as an "IPO Mill" herein.

Figure 5:
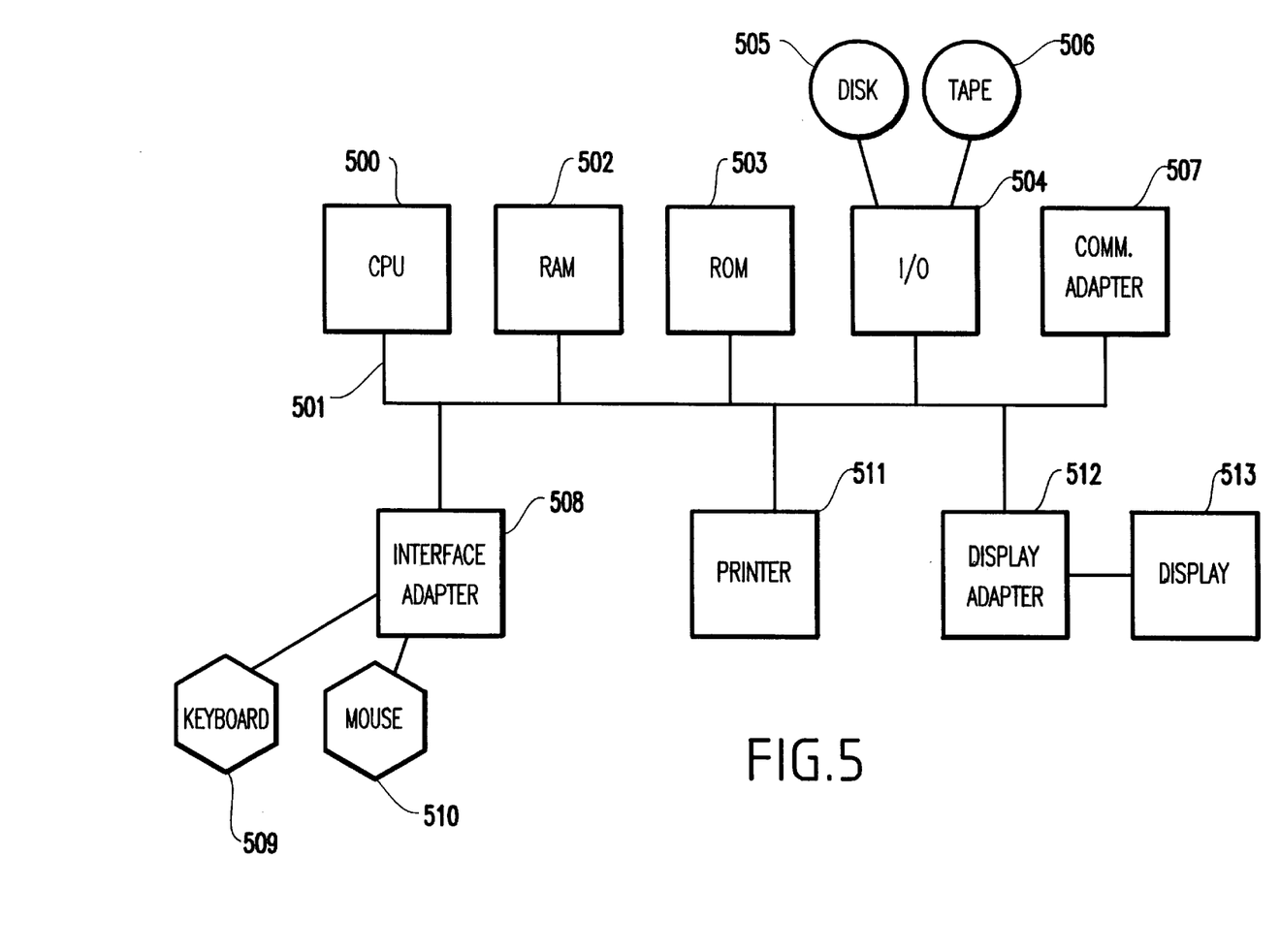
FIG. 5 is a schematic diagram of a hardware embodiment of the invention.

While the overall methodology of the invention is described above, the invention can be embodied in any number of different types of systems and executed in any number of different ways, as would be known by one ordinarily skilled in the art. For example, as illustrated in FIG. 5, a typical hardware configuration of an information handling/computer system in accordance with the invention preferably has at least one processor or central processing unit (CPU) 500. For example, the central processing unit 500 could include various processing units, mapping units, weighting units, adders, subtractors, comparators, etc. for performing the logical functions of recording and allocating sales of distributorships and products, as discussed above. Alternatively, as would be known by one ordinarily skilled in the art given this disclosure, multiple specialized CPU's (or other similar individual functional units) could perform the same processing, mapping, weighting, adding, subtracting, comparing, etc.

The CPU 500 is interconnected via a system bus 501 to a random access memory (RAM) 502, read-only memory (ROM) 503, input/output (I/O) adapter 504 (for connecting peripheral devices such as disk units 505 and tape drives 506 to the bus 501), communication adapter 507 (for connecting the information handling system to the Internet) user interface adapter 508 (for connecting peripherals 509, 510 such as a keyboard, mouse, microphone speaker and/or other user interface device to the bus 501), a printer 511, and display adapter 512 (for connecting the bus 501 to a display device 513). The invention could be implemented using the structure shown in FIG. 5 by including the inventive method within a computer program stored on the storage device 505. Such a computer program would act on information supplied through the interface units 509, 510 or through the network connection 507. The system would then automatically produce the final desired product on the display 513, through the printer 511 or back to the network 507.

The heart of invention is the new approach to bringing customers to the Web sites, the DEA distribution system. As shown above, the distributors support the program by shepherding neighborhood customers to the sites. In turn, it is the inventive method for selling the DEA's, monitoring their sale and controlling compliance (with rules, regulations, exclusivity, and commission payments) that creates this support.

As mentioned above, the success of the invention is driven by the manner in which the distributor is compensated, helping to solve the conflict of distribution channels. The distributor is compensated based upon the product, service, or specified item being delivered within his/her exclusive area. This solves the problem of accounting for sales, of accounting for who is responsible for the sale, of accounting for where the sale was made as well as the myriad of problems that have prevented a method and system of distributorships from being formed to represent e-commerce activity. It also solves the problem of providing geographic form, for a limited purpose, to the Internet. These problems are solved as a result of the method of controlling the sale and purchase of the distributorships.

One problem that the invention solves is that the Internet cannot be divided, segmented, regionalized, or otherwise arranged into areas with geographic borders. This is the nature of the World Wide Web, the Internet, and e-commerce. It defies even the regional nature of telephone companies or cable companies.

The solution provided by the invention is to divide the customers, separating them into defined areas (e.g., DEAs). The customer is then brought to the Web site from a defined area. This process is hosted by the DEA distributor, who is involved in guiding the customer to a site but is not involved in the sale.

Another solution that the invention provides, which allows the payment of commissions based upon defined areas, is to track the delivery of all products and services from the Web partners or licensees and allocating the commission payment based on where the product or service was delivered. The means for making these payments would otherwise be impractical, if not impossible, but for the invention of the Internet DEA.

With respect to the brick and mortar retailer, the invention's solution takes the sales representative out of the store and into the neighborhood, as a defined area distributor. What makes this work is that the defined area is exclusive to the specific distributor. This factor allows the distributors compensation to be properly administered. The central corporations method, while sacrificing some of the volume of representation, offers a unique method that results in the ability to protect, absolutely, the distributor's commission.

With respect to the "direct-to-consumer" retailer, again, the invention's approach to this problem is to define exclusive areas and pay commissions based, not on who sells the product (e.g., company or representative), where the product is sold or shipped from, or even what kind or size of customer buys the product (e.g., company accounts). Instead, the only criterion for the inventive defined, exclusive area distribution system is where the product is delivered. The result is to expand the reach of the Internet by providing localized distribution niches. The scope of these local distribution networks is applicable to all commerce embodiments of the Internet.

While the invention has been described in terms of preferred embodiments, those skilled in the art will recognize that the invention can be practiced with modification within the spirit and scope of the appended claims.

What is claimed is:

1. A method of allocating commissions comprising:
   providing exclusive geographic distribution/representation areas;
   recording sales to said exclusive geographic distribution/representation areas placed through an Internet web site;
   determining a value of said sales to each of said geographic distribution/representation areas; and
   allocating said commissions based solely on said value of said sales delivered to each of said geographic distribution/representation areas.

2. The method in claim 1, wherein said providing includes selling said exclusive geographic distribution/representation area for one of a plurality of Web partner programs in one of said geographic distribution/representation areas.

3. The method in claim 2, wherein each of said Web partner programs is associated with a distinct product line.

4. The method in claim 2, wherein only one particular Web partner program can be owned within a given exclusive geographic distribution/representation area.

5. The method in claim 2, further comprising maintaining records of said sales for said plurality of Web partner programs through a single centralized system.

6. The method in claim 2, further comprising using funds generated by said providing to operate said Web partner programs.

7. The method in claim 1, wherein said providing includes verifying a sale of said exclusive distribution/representation areas through digital recording of an oral agreement.

8. A method of allocating, to the Internet, defined geographic areas comprising:
   establishing exclusive geographic distribution/representation areas;
   recording sales to said exclusive geographic distribution/representation areas placed through an Internet web site;
   determining and tracking the value of said sales to each of said geographic distribution/representation areas; and
   allocating said commissions based solely on said value of said sales delivered to each of said geographic distribution/representation areas.

9. The method in claim 8, wherein said establishing includes selling said exclusive geographic distribution/representation area for one of a plurality of Web partner programs in one of said geographic distribution/representation areas.

10. The method in claim 9, wherein each of said Web partner programs is associated with a distinct product line.

11. The method in claim 9, wherein only one particular Web partner program can be owned within a given exclusive geographic distribution/representation area.

12. The method in claim 9, further comprising maintaining records of said sales for said plurality of Web partner programs through a single centralized system.

13. The method in claim 9, further comprising using funds generated by said establishing to operate said Web partner programs.

14. The method in claim 8, wherein said establishing includes verifying a sale of said exclusive distribution/representation areas through digital recording of an oral agreement.

15. A method of developing Internet Web sites comprising:
   providing exclusive geographic distribution/representation areas;
   recording sales to said exclusive geographic distribution/representation areas placed through an Internet web site;
   determining a value of said sales to each of said geographic distribution/representation areas; and
   allocating said commissions based solely on said value of said sales delivered to each of said geographic distribution/representation areas.

16. The method in claim 15, wherein said providing includes providing said exclusive geographic distribution/representation area for one of a plurality of Web partner programs in one of said geographic distribution/representation areas.

17. The method in claim 16, wherein each of said Web partner programs is associated with a distinct product line.

18. The method in claim 16, wherein only one entity can own a particular Web partner program within a given exclusive geographic distribution/representation area.

19. The method in claim 15, further comprising maintaining records of said sales for said plurality of Web partner programs through a single centralized system.

20. The method in claim 15, further comprising using funds generated by said providing to operate said Web partner programs.

21. The method in claim 15, wherein said providing includes verifying a sale through digital recording of an oral agreement.

22. A method of using a computer program on a computerized system to allocate commissions comprising:
   using said computer program to sell exclusive geographic distribution/representation areas;
   using said computer program to record sales to said exclusive geographic distribution/representation areas placed through an Internet web site;
   using said computer program to determine a value to each of said geographic distribution/representation areas; and
   using said computer program to allocate said commissions based solely on said value of said sales delivered to each of said geographic distribution/representation areas.

23. The method in claim 22, wherein said providing includes using said computer program to sell said exclusive geographic distribution/representation area for one of a plurality of Web partner programs in one of said geographic distribution/representation areas.

24. The method in claim 23, wherein each of said Web partner programs is associated with a distinct product line.

25. The method in claim 23, wherein only one entity can own a particular Web partner program within a given exclusive geographic distribution/representation area.

26. The method in claim 22, further comprising using said computer program to maintain records of said sales for said plurality of Web partner programs through a single centralized system.

27. The method in claim 22, further comprising using said computer program to utilize funds generated by said providing to operate said Web partner programs.

28. The method in claim 22, wherein said providing includes using said computer program to verify a sale through digital recording of an oral agreement.

29. A system for allocating commissions comprising:
   an Internet Web site providing exclusive geographic distribution/representation areas;
   a memory for recording sales to said exclusive geographic distribution/representation areas placed through said Internet web site;
   a calculation unit determining a value of said sales to each of said geographic distribution/representation areas; and
   a decision unit allocating said commissions based solely on said value of said sales delivered to each of said geographic distribution/representation areas.

30. The system in claim 29, wherein said Internet Web site sells said exclusive geographic distribution/representation area for one of a plurality of Web partner programs in one of said geographic distribution/representation areas.

31. The system in claim 30, wherein each of said Web partner programs is associated with a distinct product line.

32. The system in claim 30, wherein only one particular Web partner program can be owned within a given exclusive geographic distribution/representation area.

33. The system in claim 30, further comprising a centralized record keeping unit maintaining records of said sales for said plurality of Web partner programs.

34. The system in claim 30, further comprising a funds allocator using funds generated by providing said exclusive geographic distribution/representation areas to operate said Web partner programs.

35. The system in claim 29, wherein said Internet Web site verifies a sale of said exclusive geographic distribution/representation area through digital recording of an oral agreement.

36. A system for allocating, to the Internet, defined geographic areas comprising:
   an Internet Web site providing exclusive geographic distribution/representation areas;
   a memory for recording sales to said exclusive geographic distribution/representation areas placed through said Internet web site;
   a calculation unit determining a value of said sales to each of said geographic distribution/representation areas; and
   a decision unit allocating said commissions based solely on said value of said sales delivered to each of said geographic distribution/representation areas.

37. The system in claim 36, wherein said Internet Web site sells said exclusive geographic distribution/representation area for one of a plurality of Web partner programs in one of said geographic distribution/representation areas.

38. The system in claim 37, wherein each of said Web partner programs is associated with a distinct product line.

39. The system in claim 37, wherein only one particular Web partner program can be owned within a given exclusive geographic distribution/representation area.

40. The system in claim 37, further comprising a centralized record keeping unit maintaining records of said sales for said plurality of Web partner programs.

41. The system in claim 37, further comprising a funds allocator using funds generated by providing said exclusive geographic distribution/representation areas to operate said Web partner programs.

42. The system in claim 36, wherein said Internet Web site verifies a sale of said exclusive geographic distribution/representation area through digital recording of an oral agreement.

* * * * *